United States Patent
Zajac

(10) Patent No.: US 10,257,786 B2
(45) Date of Patent: *Apr. 9, 2019

(54) METHOD AND APPARATUS FOR MANAGING A DISPLAY OF A MOBILE ELECTRONIC DEVICE FOR POWER SAVING

(71) Applicant: Futurewei Technologies, Inc., Plano, TX (US)

(72) Inventor: Adam Zajac, San Diego, CA (US)

(73) Assignee: Futurewei Technologies, Inc., Plano, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/217,709

(22) Filed: Jul. 22, 2016

(65) Prior Publication Data

US 2016/0330692 A1    Nov. 10, 2016

Related U.S. Application Data

(63) Continuation of application No. 14/879,983, filed on Oct. 9, 2015, now Pat. No. 9,414,318, which is a (Continued)

(51) Int. Cl.
*H04W 52/02* (2009.01)
*G06F 1/3212* (2019.01)
*H04M 1/725* (2006.01)

(52) U.S. Cl.
CPC ...... *H04W 52/0264* (2013.01); *G06F 1/3212* (2013.01); *H04M 1/72552* (2013.01);
(Continued)

(58) Field of Classification Search
CPC .......... H04W 52/0624; H04W 52/0264; G06F 1/3212
See application file for complete search history.

(56) References Cited

U.S. PATENT DOCUMENTS 8,122,272 B2    2/2012   Finkelstein et al.
8,170,437 B2    5/2012   Sugimoto
(Continued)

FOREIGN PATENT DOCUMENTS

CN    101287037 A    10/2008
CN    101873385 A    10/2010
(Continued)

OTHER PUBLICATIONS

"Battery Percentage 'Widget' for Nokia N9," https://talk.maemo.org/showthread.php?t=82526, Feb. 24, 2012, total 7 pages.
(Continued)

*Primary Examiner* — Albert Wang
(74) *Attorney, Agent, or Firm* — Yeh Kurt Chang

(57) ABSTRACT

Embodiments of the present invention provide methods and apparatuses for reducing power consumption for a mobile electronic device in order to extend battery life. In an embodiment, the mobile electronic device monitors a power level of the battery in the mobile electronic device, determines that the power level of the battery reaches a predetermined threshold, and based upon the determination, terminates a first launcher currently running on the mobile electronic device and activates a second launcher on the mobile electronic device. By activating the second launcher which has power saving features, the power consumption of the mobile electronic device is reduced and thus the battery life is extended while preserving the basic functions of the mobile device.

22 Claims, 6 Drawing Sheets

Related U.S. Application Data continuation of application No. 14/329,663, filed on Jul. 11, 2014, now Pat. No. 9,198,135, which is a continuation of application No. 14/243,673, filed on Apr. 2, 2014, now Pat. No. 8,972,760, which is a continuation of application No. 14/137,490, filed on Dec. 20, 2013, now abandoned.

(52) U.S. Cl.
CPC ..... *H04M 1/72583* (2013.01); *H04W 52/027* (2013.01); *H04W 52/029* (2013.01); *H04M 2250/02* (2013.01); *Y02D 10/174* (2018.01); *Y02D 70/1222* (2018.01); *Y02D 70/1244* (2018.01); *Y02D 70/1246* (2018.01); *Y02D 70/142* (2018.01); *Y02D 70/144* (2018.01); *Y02D 70/146* (2018.01); *Y02D 70/164* (2018.01); *Y02D 70/23* (2018.01)

(56) References Cited

U.S. PATENT DOCUMENTS

| | | | |
|---|---|---|---|
| 8,446,398 | B2 | 5/2013 | Ferren et al. |
| 8,644,846 | B2 | 2/2014 | Kim et al. |
| 8,655,307 | B1 | 2/2014 | Walker et al. |
| 8,713,241 | B2 | 4/2014 | Borras et al. |
| 8,872,836 | B2 | 10/2014 | Rabii |
| 2001/0029196 | A1 | 10/2001 | Wakamatsu |
| 2001/0041605 | A1 | 11/2001 | Suzuki |
| 2006/0020906 | A1 | 1/2006 | Plut |
| 2007/0271527 | A1* | 11/2007 | Paas ............... G06F 3/048 715/810 |
| 2008/0200220 | A1 | 8/2008 | Jackson |
| 2010/0048253 | A1 | 2/2010 | Park et al. |
| 2010/0330950 | A1 | 12/2010 | Wells et al. |
| 2011/0055596 | A1 | 3/2011 | Wyatt |
| 2011/0195723 | A1 | 8/2011 | Kim et al. |
| 2011/0249022 | A1 | 10/2011 | Poornachandran et al. |
| 2012/0077554 | A1* | 3/2012 | Ahn ............... H04W 52/027 455/574 |
| 2012/0169608 | A1* | 7/2012 | Forutanpour ....... G09G 3/342 345/173 |
| 2012/0178496 | A1 | 7/2012 | Hwang et al. |
| 2012/0188262 | A1 | 7/2012 | Rabii |
| 2012/0297215 | A1 | 11/2012 | Saba |
| 2013/0130745 | A1 | 5/2013 | Niu et al. |
| 2013/0196709 | A1 | 8/2013 | Nho |
| 2013/0241918 | A1 | 9/2013 | Satyan |
| 2014/0051379 | A1 | 2/2014 | Ganesh et al. |
| 2014/0344951 | A1 | 11/2014 | Brewer |
| 2015/0061988 | A1 | 3/2015 | Galu, Jr. |
| 2015/0149802 | A1 | 5/2015 | Vayrynen |
| 2015/0156307 | A1 | 6/2015 | Kim et al. |
| 2015/0208356 | A1 | 7/2015 | Niu et al. |

FOREIGN PATENT DOCUMENTS

| | | |
|---|---|---|
| CN | 202135331 U | 2/2012 |
| CN | 102624991 A | 8/2012 |
| CN | 102799481 A | 11/2012 |
| CN | 103207660 A | 7/2013 |
| EP | 1884914 A1 | 2/2008 |
| EP | 2288040 A1 | 2/2011 |
| EP | 2475204 A2 | 7/2012 |
| JP | 2008-278274 A | 11/2008 |
| JP | 2013-27644 A | 2/2013 |
| JP | 2013192010 A | 9/2013 |
| KR | 20130105235 A | 9/2013 |
| KR | 10-2013-0118967 A | 10/2013 |
| RU | 2481615 C2 | 5/2013 |
| WO | 00/78012 A1 | 12/2000 |
| WO | 2007/071919 A1 | 6/2007 |
| WO | 2012/102882 A1 | 8/2012 |
| WO | 2013/079726 A1 | 6/2013 |

OTHER PUBLICATIONS

Rempel, John, "A Review of BIG Launcher, the Android App with Seniors in Mind," AFB AccessWorld Magazine, vol. 14, No. 11, Nov. 2013. Total 5 pages.

"Battery & Power: Samsung Galaxy S Relay 4G," T-Mobile Support, https://support.t-mobile.com/docs/DOC-8444, Sep. 12, 2013. Total 5 pages.

Google, Inc., Car Home App Description, Google Play Store, Updated Feb. 10, 2011, Total 4 pages.

Hill, Simon, "Galaxy S3 Is Almost Two Years Old, But We've Got New Tips and Tricks for You," http://www.digitaltrends.com/mobile/galaxy-s3-helpful-tips/. Mar. 13, 2014. Total 13 pages.

"Launchers Part 2—Simplified Launchers," 22 Point Blog!, https://22point.wordpress.com/2013/07/11/launchers-part-2-simplified-launchers/. Jul. 11, 2013. Total 9 pages.

"N85: Unable to Deactivate Power Saving Mode," http://answers.microsoft.com/en-us/mobildevices/forum/mdnokian/n85-unable-to-deactivate-power-saving-mode/5c87a6a0fc424759bb7d04695f12051c?auth=1. Nov. 8, 2008. Total 4 pages.

Wells, Antonio, "Samsung Galaxy S4—A Definitive Guide," www.bluestacks.com/blog/appreviews/archive/author/awells.html. Jun. 26, 2013. Total 8 pages.

"How do I configure the Power Saving mode on my Samsung Galaxy S Captivate?" http://www.samsung.com/us/support/howtoguide/N0000003/7120/48486. Total 2 pages. Jun. 22, 2012.

"Android App Turns your Smartphone into a Simple Phone for Seniors," http://www.labnol.org/software/android-phone-for-seniors/21087/, Sep. 8, 2016. Total 5 pages.

"The official explanation about power saving mode," http://www.wpxap.com/thread-386471-1-1.html, English translation. Total 7 pages. May 15, 2012.

"Tip: Samsung Galaxy S II Power Saving Mode," www.careace.net/2011/09/14/tip-samsung-galaxy-s-ii-power-saving-mode/, Total 3 pages. Sep. 14, 2011.

"Using Power Saver Mode," www.htc.com/www/support/htc-one-x-plus/howto/284791.html. Total 4 pages. Jan. 2014.

Vivo, "X3 Ultra Power Saving Mode," Total 10 pages. Oct. 3, 2013.

Fei Peng, "You don't know the eight Windows phone tips," http://digi.tech.qq.com/a/20130630/000886.htm, English translation. Total 8 pages. Jun. 30, 2013.

"Microsoft's new patent allows Windows Phone 8 system more power," www.baidu.com, English translation. Total 2 pages. Apr. 30, 2013.

* cited by examiner

METHOD AND APPARATUS FOR MANAGING A DISPLAY OF A MOBILE ELECTRONIC DEVICE FOR POWER SAVING

This application is a continuation of U.S. patent application Ser. No. 14/879,983, filed on Oct. 9, 2015, now allowed, which is a continuation of U.S. patent application Ser. No. 14/329,663, filed on Jul. 11, 2014, now U.S. Pat. No. 9,198,135, which is a continuation of U.S. patent application Ser. No. 14/243,673, filed on Apr. 2, 2014, now U.S. Pat. No. 8,972,760, which is a continuation of U.S. patent application Ser. No. 14/137,490, filed on Dec. 20, 2013, now abandoned, all of which applications are hereby incorporated herein by reference.

TECHNICAL FIELD

This invention generally relates to mobile electronic devices, and more specifically to a method and apparatus of reducing power consumption in a mobile electronic device.

BACKGROUND

Current mobile electronic devices such as smartphones and tablet computers on the market suffer from significantly decreased battery life in comparison with previous generations of smartphones and feature phones due to enriched communication capabilities as well as more complex applications provided by such devices. While modern phones offer a richer and more pleasing experience to end users with the variety of data driven features, the customer's ability to utilize a very basic calling functionality has been dramatically reduced due to the shortened battery life between charging cycles. This leads to numerous situations where users can no longer place basic voice calls when the battery reaches a near-depletion level.

In order to extend battery life, users may manually turn off functions to save power. For example, users may turn off Bluetooth, Wi-Fi, and vibrate and keytones etc. Users may also lower the screen brightness, set a shorter screen timeout, etc.

SUMMARY

Embodiments of the present invention provide a method and apparatus for reducing power consumption in a mobile device so as to address the above deficiencies and other problems associated with power saving for mobile devices.

One embodiment of the present invention provides a method of reducing power consumption for a mobile electronic device, including: monitoring a power level of a battery in the mobile electronic device, determining that the power level of the battery reaches a predetermined threshold, and based upon the determination, terminating a first launcher currently running on the mobile electronic device and activating a second launcher on the mobile electronic device.

Another embodiment of the present invention provides an apparatus for reducing power consumption for a mobile electronic device, including: memory, and one or more processors coupled to the memory and configured to monitor a power level of a battery in the mobile electronic device, determine that the power level of the battery reaches a predetermined threshold, and based upon the determination, terminate a first launcher currently running on the mobile electronic device and activate a second launcher on the mobile electronic device.

In at least some embodiments, the first launcher may be a full user experience launcher, while in contrast, the second launcher may be a reduced user experience, power saving launcher. When a battery power level threshold is determined to be reached, the electronic device terminates a currently running first launcher, and activates the second launcher to extend the battery life. Therefore, the mobile electronic device may automatically conserve its power for basic, essential functions such as phone calls, and text messaging.

DETAILED DESCRIPTION

Reference will now be made in detail to embodiments of the present invention, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details or that various changes and substitutions can be made thereto without departing from the spirit and scope of the present invention. In other instances, well-known methods, procedures, components, and circuits have not been described in detail so as not to unnecessarily obscure aspects of the embodiments.

Figure 1:
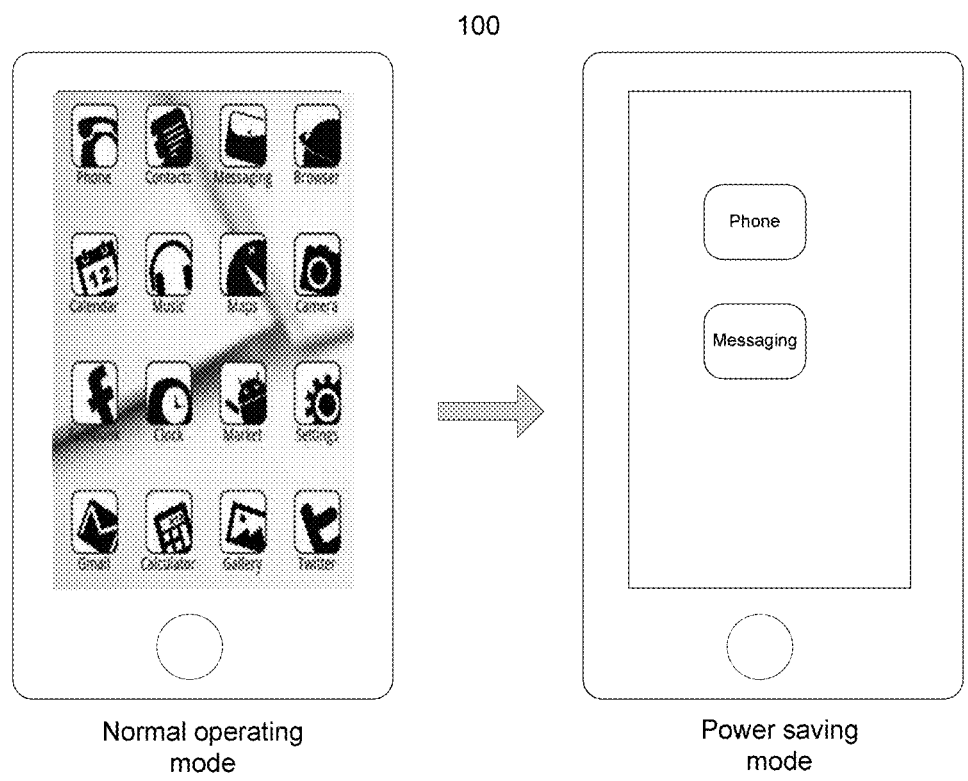
FIG. 1 illustrates the GUI display of a mobile electronic device in a normal operating mode employing a first launcher and in a power saving mode employing a second launcher in accordance with an embodiment of the present invention.

FIG. 1 illustrates a mobile electronic device 100, e.g., a smartphone or a tablet device, in accordance with an embodiment of the present invention. The mobile electronic device 100 usually works in a normal operating mode (shown on the left side of FIG. 1) in which functions on the mobile electronic device operate normally without sacrificing user experience to save energy of the battery. A first launcher is employed to display icons of functions on a screen as shown in the FIG. 1. When the power level of the battery is determined to be lower than a preset threshold, the mobile electronic device 100 works in a power saving mode (shown on the right side of FIG. 1). The mobile electronic device 100 may shut down or degrade functions that are not related to voice communication and text messaging functions and display only those icons for only those functions that remain active. The mobile electronic device 100 switches from the normal operating mode to the power saving mode by switching from the first launcher to a second launcher, as described in greater detail below. The second launcher has power saving features that may, for example, disable or degrade the graphics processing unit (GPU) of the mobile electronic device, eliminate graphical effects, degrade display resolution, and/or scale down the CPU frequency. Many functions are shut down when the mobile electronic device 100 works in the power saving mode and accordingly, the second launcher does not display the functions that have been shut down on the screen. For example, the second launcher may only display icons on the screen for phone calling and text messaging as shown in FIG. 1.

Figure 2:
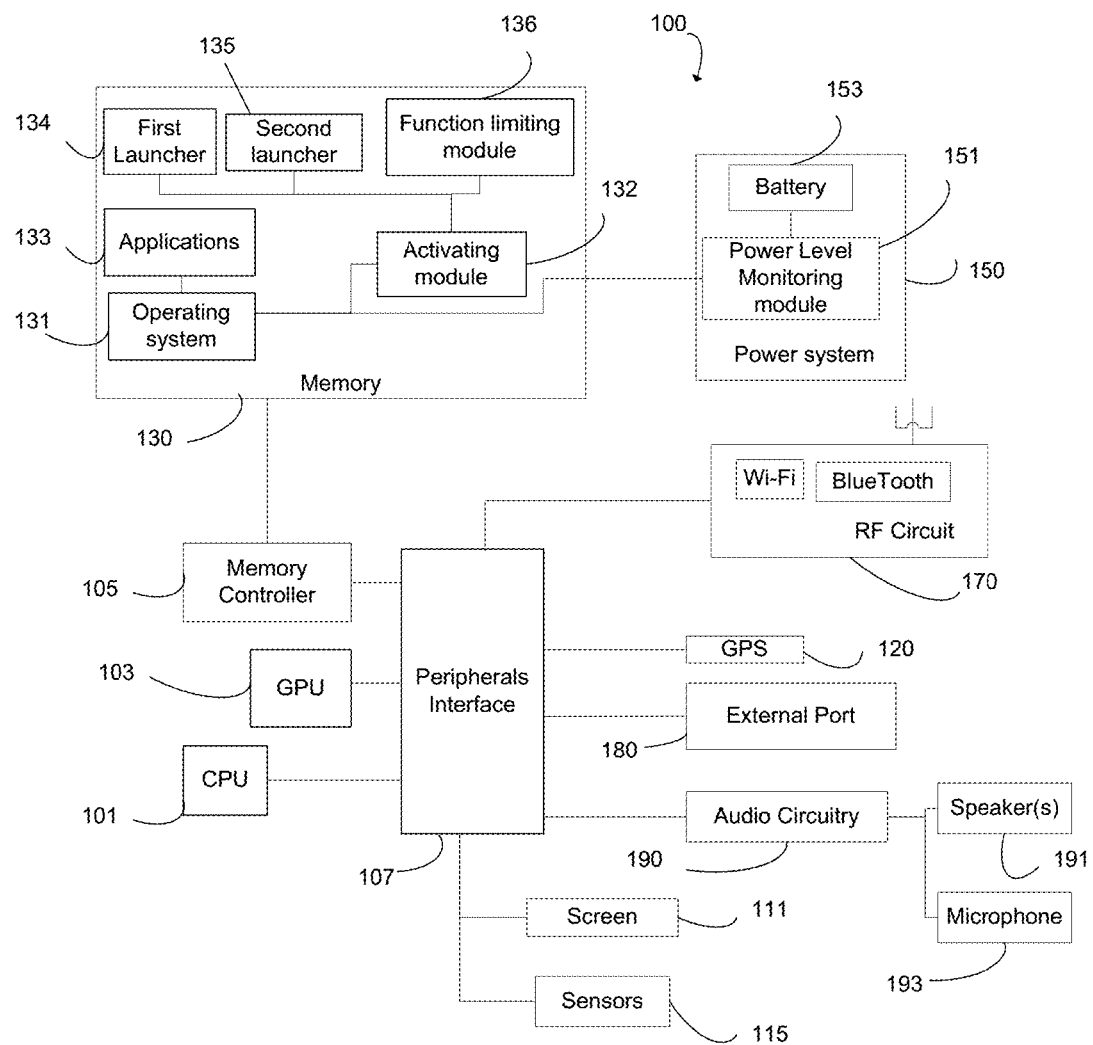
FIG. 2 is a block diagram illustrating a mobile electronic device in accordance with an embodiment of the invention.

FIG. 2 illustrates the mobile electronic device 100 according to an embodiment of the present invention. The device 100 includes a memory 130, a memory controller 105, a central processing unit (CPU) 101, a graphics processing unit (GPU) 103, a peripheral interface 107, Radio Frequency (RF) circuitry 170, audio circuitry 190, a screen 111, an external port 180, a Global Positioning System module (GPS) 120 and a power system 150. These components communicate over one or more communication buses or signal lines. The mobile electronic device 100 can be, for example, a handheld computer, a tablet computer, a mobile phone, a media player or a personal digital assistant (PDA). The various components shown in FIG. 2 may be implemented in hardware or a combination of hardware and software, including one or more signal processing and/or application specific integrated circuits.

The memory 130 may include high speed random access memory and may also include non-volatile memory, such as one or more magnetic disk storage devices, flash memory devices, or other non-volatile solid state memory devices. Access to the memory 130 by other components of the device 100, such as the CPU 101, the GPU 103, and the peripherals interface 107, may be controlled by the memory controller 105.

In other embodiments of the present invention, the memory 130 may include storage remotely located from the mobile electronic device 100, for instance network attached storage accessed via the RF circuitry 170 or external port 180 and a communications network (not shown) such as the Internet, intranet(s), Local Area Networks (LANs), Wide Local Area Networks (WLANs), Storage Area Networks (SANs) and the like, or any suitable combination thereof.

Referring back to FIG. 2, the peripherals interface 107 couples the input and output peripherals of the device 100 to the CPU 101, the GPU 103 and the memory 130. The CPU 101 runs various software programs and/or sets of instructions stored in the memory 130 to perform various functions for the device 100 and to process data. The GPU 103 handles graphic processing functions for the screen 111. In some embodiments, the graphic processing functions are handled by the CPU 101, so the GPU 103 may be replaced.

The external port 180 is adapted for coupling to other devices either directly or remotely over a network. For example, the external port 180 could comprise a Universal Serial Bus (USB), FireWire, memory slot for receiving an external storage medium, etc.

RF (radio frequency) circuitry 170 receives and sends RF signals, also called electromagnetic signals. RF circuitry 170 converts electrical signals to/from electromagnetic signals and communicates with communications networks and other communications devices via the electromagnetic signals. RF circuitry 170 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 170 may communicate with networks, such as the Internet, an intranet and/or a wireless network, such as a cellular telephone network, a wireless local area network (LAN) and/or a metropolitan area network (MAN), and other devices by wireless communication. The wireless communication networks may use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, or any other suitable communication protocol The audio circuitry 190 connects with one or more speakers 191 and a microphone 193. Together these components provide an audio interface between a user and the device 100. The audio circuitry 190 receives audio data from the peripherals interface 107, converts the audio data to an electrical signal, and transmits the electrical signal to the speaker(s) 191. The speaker(s) 191 converts the electrical signal to human-audible sound waves. The audio circuitry 190 also receives electrical signals converted by the microphone 193 from sound waves. The audio circuitry 190 converts the electrical signal to audio data and transmits the audio data to the peripherals interface 107 for processing. Audio data may be retrieved from and/or transmitted to the memory 130 and/or the RF circuitry 170 by the peripherals interface 107.

The screen 111 may be a touch-screen and provides both an output interface and an input interface between the device and a user. The screen 111 displays visual output to the user that may include text, graphics, video, and any combination thereof. Some or all of the visual output may correspond to user-interface objects, further details of which are described below. The screen 111 may use LCD (liquid crystal display) technology, or other known display technologies. The screen 111 also accepts input from the user based on haptic and/or tactile contact.

The device 100 also includes a power system 150 for powering the various components. The power system 150 may include a battery 153 for storing power, a conventional power level monitoring module 151 for monitoring the power level of the battery 153, and any other components associated with the generation, management and distribution of power in mobile devices. The battery 153 may be implemented by a rechargeable battery, such as a lithium ion battery to provide direct current power. The power level monitoring module 151 may include electronics coupled to the battery 153 that can detect the energy level of the battery 153.

The operating system 131 stored in the memory 130 (e.g., Android, RTXC, Linux, UNIX, Apple OS X, Microsoft Windows, or an embedded operating system such as VxWorks) includes various software components and/or drivers for controlling and managing general system tasks (e.g., memory management, storage device control, power management, etc.) and facilitates communication between various hardware and software components. Although many kinds of operating systems may be applied, the following description will use Android as an example to describe embodiments of this invention. Various applications 133 may be installed on the operating system 131.

Memory 130 also contains a first launcher 134 and a second launcher 135. Generally speaking, a launcher is a software program that presents links on a screen for starting other software programs installed in a mobile electronic device. It should be noted that other embodiments of the present invention may use more than two launchers.

Figure 3:
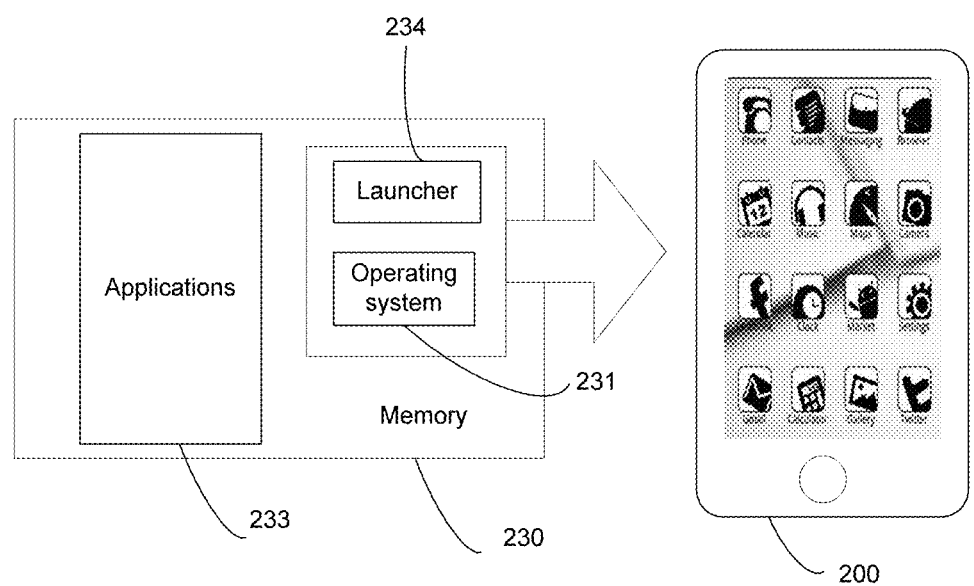
FIG. 3 is a block diagram conceptually illustrating the components of a launcher in accordance with an embodiment of the present invention.

FIG. 3 conceptually illustrates the operational components of a launcher. In some embodiments of the present invention, the launcher could comprise a collection of multiple function titles displayed to the user, along with links to functional code which together allow the user to identify a function title, and to select and open it. The links presented by the launcher may include: a window displayed on the screen which shows multiple function icons; a list of function titles, such as a drop-down list; or a toolbar included in an Internet browser or another program, with buttons for opening the functions. All of these links allow the user to select and open a desired application or function. Also, a launcher may include one or more titles that allow access to file folders or other windows. As shown in FIG. 3, an exemplary launcher 234 includes executable launcher code embedded in an operating system 231. The launcher 234 is used to present a user interface containing function titles (illustrated as icons) for viewing on a screen of a mobile electronic device 200. When the user selects a function title via the user interface, the launcher executes a respective executable application 233 in a memory 230 for activating a respective function.

Referring back to FIG. 2, the memory 130 may further include an activating module 132 that interacts with the operating system 131, the first launcher 134, the second launcher 135, and a function limiting module 136 as described below.

The activating module 132 is configured to receive the power level of the battery 153 obtained from the power level monitoring module 151 of the power system 150, compare the power level with a pre-defined threshold, and activate a corresponding launcher 134 or 135 stored in the memory 130 for the device 100 according to the comparison. The threshold may be input or selected by the user. For example, the pre-defined threshold may be 20% (20% power left), which means that when the power level of the battery 153 is greater than 20%, the mobile device 100 uses the first launcher 134, otherwise, the mobile device activates the second launcher 135 to replace the first launcher 134.

The activating module 132 may be further configured to activate the function limiting module 136 stored on the memory 130. For example, when the power level is less than the pre-defined threshold, the activating module 132 may also activate the function limiting module 136 to start disabling or degrading certain functions of the mobile device 100.

The first launcher 134 displays links for starting other software programs on the screen 111 with a full user experience. Full user experience means functions on the mobile device are performed normally without sacrificing user experience to save energy of the battery 153.

In contrast to the first launcher 134, the second launcher 135 is a reduced user experience launcher and will be applied when the device enters the power saving mode. For example, when the activating module 132 determines that the power level of the battery 153 is less than a certain pre-defined threshold, for example, 20%, the activating module 132 will activate the second launcher 135.

In other embodiments, the function limiting module 136 may be implemented as a part of the second launcher 135.

Figure 4A:
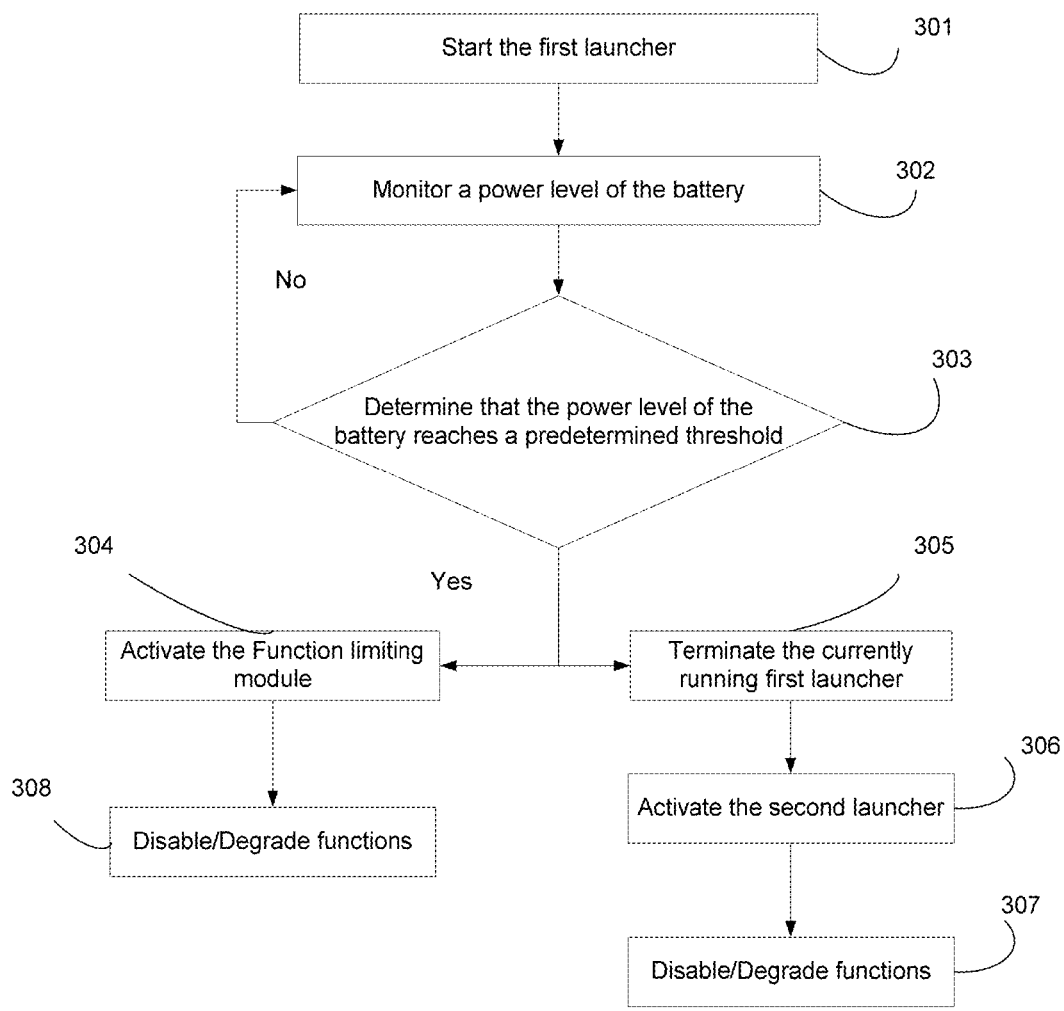
FIGS. 4A-4C are flowcharts illustrating a process for transitioning a mobile electronic device to a power saving mode in accordance with an embodiment of the invention.
Figure 4B:
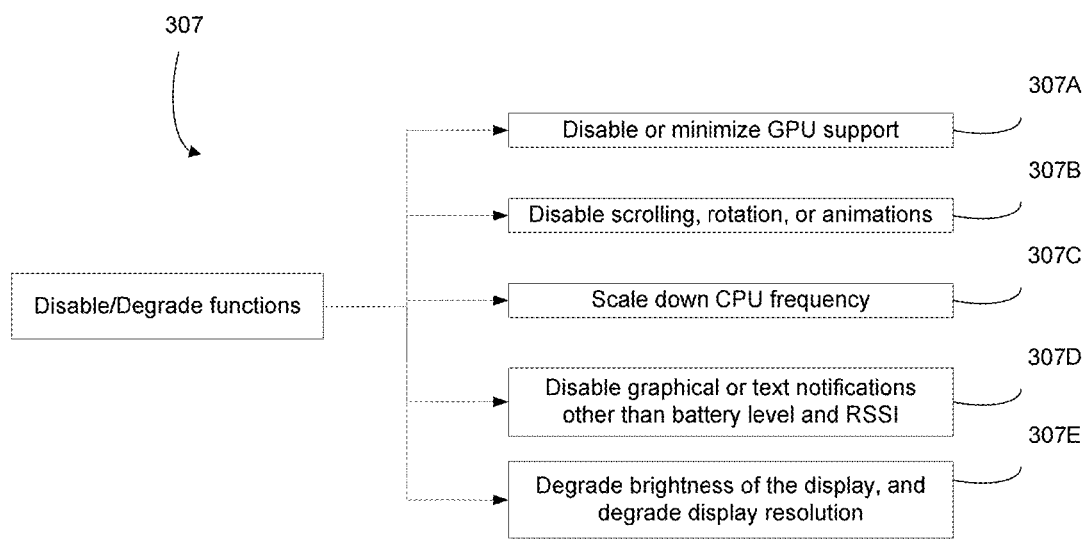
Figure 4C:
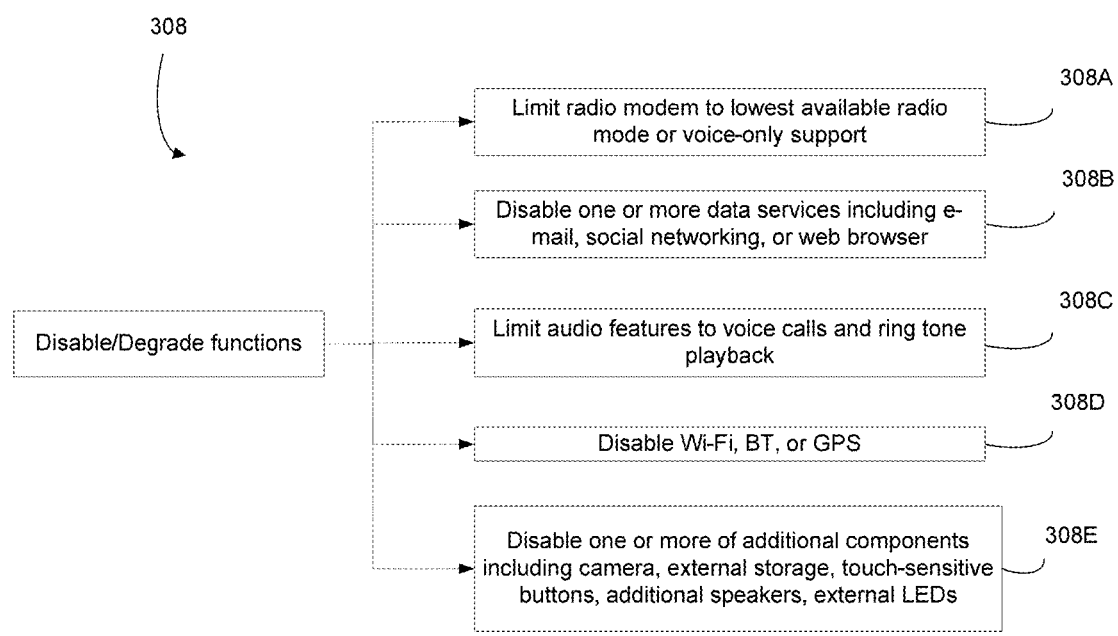

FIGS. 4A-4C are flowcharts illustrating a process for switching from the first launcher 134 to the second launcher 135 and activating the function limiting module 136 when the power level of the battery 153 reaches the predefined threshold in accordance with an embodiment of the invention.

In step 301, start the first launcher 134. Initially, when the battery 153 is full charged, or the power level of the battery 153 is greater than a predefined threshold, the mobile device 100 begins execution of the first launcher 134. So the mobile device 100 is capable of providing rich communication service and maintaining normal performance without sacrificing performance for saving power.

In step 302, monitor a power level of the battery 153. The power level monitoring module 151 in the power system 150 will keep monitoring the power level of the battery 153 and reporting the power level of the battery 153 back to the operating system 131. The activating module 132 obtains the power level of the battery 153 via the operating system 131.

In step 303, determine that the power level of the battery 153 reaches a predetermined threshold. The activating module 132 compares the obtained power level of the battery 153 with a preset threshold. For example, the preset threshold may be input by a user or may be configured by a manufacturer of the mobile device 100. If the threshold is not reached, the activating module 132 continues to monitor the power level of the battery 153.

In step 305, terminate the currently running first launcher 134. If the threshold is reached, the activating module 132 terminates the currently running first launcher 134, and proceeds to step 306.

In step 306, activate the second launcher 135 using the activating module 132.

In step 304, activate the function limiting module 136. The activating module 132 may activate the function limiting module 136 to start degrading or disabling functions of the device 100. It should be noted that the threshold for starting the second launcher 135 and the threshold for starting the function limiting module 136 may or may not be the same threshold.

In step 307, disable or degrade functions. Once the second launcher 135 is activated, the second launcher 135 as defined above may disable or degrade the GPU, eliminate graphical effects, degrade display resolution, scale down CPU frequency and/or perform other functions described above.

More specifically, referring to FIG. 4B, step 307 may further include one or more of steps 307A-307E.

In step 307A, disable or minimize GPU support. The second launcher 135 has disabled or minimized GPU support. The second launcher 135 instructs the lower level software, such as operating system (OS) kernel, via system calls to either drive and fix the frequency of the GPU 103 at the minimum allowed level or power the GPU 103 down through the available GPU hardware interfaces. Instead, the second launcher 135 may be designed to render the graphics using the CPU 101.

In step 307B, disable scrolling, rotation, or animation. The second launcher 135 disables support for one or more graphical effects include scrolling, rotation, and animation.

In step 307C, scale down CPU frequency. The second launcher 135 may include code for scaling down CPU frequency to the minimum operational level. If the CPU has multiple cores, the CPU may be set to the single core mode. The launcher will do this via system calls instructing lower level software components, such as the OS kernel to scale down the CPU frequency and disable additional cores through the CPU governor and CPU hot-plug interfaces.

In step 307D, disable graphical or text notifications other than battery level and Received Signal Strength Indication (RSSI). The second launcher 135 will support status information to the battery level, the RSSI and the clock. No other graphical or text notifications will be supported.

In step 307E, degrade brightness of the display, and degrade display resolution. The second launcher 135 may further includes code for utilizing system calls instructing the lower level SW components, such as the OS kernel, to degrade the display resolution, refresh rate, or brightness through the respective device drivers.

Referring back to FIG. 4A, in step 308, disable or degrade functions. When the function limiting module 136 is activated, the function limiting module 136 may begin to disable or degrade functions of the device. In one embodiment, the function limiting module 136 may disable all functions, programs and/or services which are not related to calling and text messaging functionality.

More specifically, referring to FIG. 4C, in the step 308 the function limiting module 136 stored on the memory 130 may be configured to perform one or more of the following steps.

In step 308A, switch radio modem to the most basic available radio mode (e.g., 2G) or voice-only support using the function limiting module 136. The radio modem limiting module 209 may utilize the system calls instructing the lower level software component, such as the OS kernel, to send control messages to the modem subsystem to switch the radio mode to the voice-only support or the most basic available radio mode.

In step 308B, disable one or more data services including e-mail, social networking, or Internet access. The function limiting module 136 may utilize dedicated OS services, for example, Activity Manager Service to terminate the data service programs.

In step 308C, limit audio features to voice calls and ring tone playback. The function limiting module 136 may utilize a dedicated OS service, for example Activity Manager Service to terminate the programs that utilize advanced multimedia services, such as music or video player and limit audio features to voice calls and ring tone playback.

In step 308D, disable Wi-Fi, Bluetooth, or GPS. The function limiting module 136 may deactivate one or more of the following connectivity functions: Wi-Fi, Bluetooth, GPS subsystems by utilizing standard OS services to disable the aforementioned connectivity components.

In step 308E, disable one or more of additional components including camera, external storage, touch-sensitive buttons, additional speakers, external LEDs.

In some embodiments, the second launcher 135 may collect information about the disabled or deactivated functions so that the second launcher 135 does not display the disabled or deactivated functions on the screen 111 of the device 100.

Although the present invention has been described with reference to specific features and embodiments thereof, it should be understood that various changes and substitutions can be made thereto without departing from the spirit and scope of the present invention as defined by the following claims.

What is claimed is:

1. A method performed by a mobile electronic device for power saving, the method comprising:
activating a first launcher in a normal operating mode of the mobile electronic device to present a first set of application icons on a screen of the mobile electronic device;
monitoring a power level of a battery powering the mobile electronic device;
determining that the power level of the battery has reached a battery power level threshold; and
based upon the determining, activating a second launcher different from the first launcher, wherein the first launcher and the second launcher are software programs that present links on the screen of the mobile electronic device for starting other software programs installed in the mobile electronic device, wherein the second launcher presents a second set of application icons on the screen of the mobile electronic device, and the application icons are for activating corresponding applications, wherein the second set contains fewer application icons as compared to the first set, and the second set includes a voice communication icon corresponding to a voice communication function and a text messaging icon corresponding to a text messaging function; disabling one or more applications on the mobile electronic device; disabling at least one of graphical or text notification on the screen of the mobile electronic device, wherein notifications for battery level, signal strength and clock remain on the screen; and displaying the voice communication icon and the text messaging icon, without displaying respective application icons for the disabled one or more applications on the screen of the mobile electronic device.

2. The method of claim 1, wherein the method further comprises:
disabling a Bluetooth function or a Wi-Fi function in the mobile electronic device.

3. The method of claim 1, wherein the method further comprises:
reducing a central processing unit (CPU) frequency and disabling at least one core of a CPU in the mobile electronic device.

4. The method of claim 1, wherein the method further comprises:
reducing a graphics processing unit (GPU) frequency of a GPU in the mobile electronic device.

5. The method of claim 1, wherein the method further comprises:
lowering a radio mode of a radio modem in the mobile electronic device.

6. The method of claim 1, wherein the method further comprises:
lowering screen brightness.

7. The method of claim 1, wherein the method further comprises:
lowering screen refresh rate.

8. The method of claim 1, wherein the method further comprises:
lowering a screen timeout.

9. The method of claim 1, wherein the method further comprises:
terminating the first launcher running on the mobile electronic device.

10. The method of claim 1, wherein the mobile electronic device is a smartphone or a tablet device.

11. The method of claim 1, wherein the first launcher is running on an operating system of the mobile electronic device before receiving the indication to enter the power saving mode, and the second launcher is running on the operating system of the mobile electronic device after receiving the indication to enter the power saving mode.

12. The method of claim 11, wherein the operating system includes an Android system.

13. A mobile electronic device, comprising:
a screen for displaying graphic information;
a processor; and
a memory coupled to the processor and storing programming for execution by the processor, wherein the processor being configured to execute the programming to perform operations of:
activating a first launcher in a normal operating mode of the mobile electronic device to present a first set of application icons on a screen of the mobile electronic device;
monitoring a power level of a battery powering the mobile electronic device;
determining that the power level of the battery has reached a battery power level threshold; and
based upon the determining, activating a second launcher different from the first launcher, wherein the first launcher and the second launcher are software programs that present links on the screen of the mobile electronic device for starting other software programs installed in the mobile electronic device, the second launcher presents a second set of application icons on the screen of the mobile electronic device, and the application icons are for activating corresponding applications, wherein the second set contains fewer application icons as compared to the first set, the second set includes a voice communication icon corresponding to a voice communication function and a text messaging icon corresponding to a text messaging function; disabling one or more applications on the mobile electronic device; disabling at least one of graphical or text notification on the screen of the mobile electronic device, wherein notifications for battery level, signal strength and clock remain on the screen; and displaying the voice communication icon and the text messaging icon, without displaying respective application icons for the disabled one or more applications on the screen of the mobile electronic device.

14. The mobile electronic device of claim 13, wherein the processor is further configured to execute the programming to perform an operation of:
disabling a Bluetooth function or a Wi-Fi function in the mobile electronic device.

15. The mobile electronic device of claim 13, wherein the processor is further configured to execute the programming to perform an operation of:
reducing a central processing unit (CPU) frequency and disabling at least one core of a CPU in the mobile electronic device.

16. The mobile electronic device of claim 13, wherein the processor is further configured to execute the programming to perform an operation of:
reducing a graphics processing unit (GPU) frequency of a GPU in the mobile electronic device.

17. The mobile electronic device of claim 13, wherein the processor is further configured to execute the programming to perform an operation of:
lowering a radio mode of a radio modem in the mobile electronic device.

18. The mobile electronic device of claim 13, wherein the processor is further configured to execute the programming to perform an operation of:
lowering screen brightness; or
lowering screen refresh rate.

19. The mobile electronic device of claim 13, wherein the processor is further configured to execute the programming to perform an operation of:
lowering a screen timeout.

20. The mobile electronic device of claim 13, wherein the processor is further configured to execute the programming to perform an operation of:
terminating the first launcher running on the mobile electronic device.

21. The mobile electronic device of claim 13, wherein the first launcher is running on an operating system of the mobile electronic device before receiving the indication to enter the power saving mode, the second launcher is running on the operating system of the mobile electronic device after receiving the indication to enter the power saving mode.

22. The mobile electronic device of claim 21, wherein the operating system includes an Android system.

* * * * *

UNITED STATES PATENT AND TRADEMARK OFFICE
CERTIFICATE OF CORRECTION

PATENT NO. : 10,257,786 B2
APPLICATION NO. : 15/217709
DATED : April 9, 2019
INVENTOR(S) : Adam Zajac It is certified that error appears in the above-identified patent and that said Letters Patent is hereby corrected as shown below:

In the Specification

In Column 4, Line 7, delete "uplink packet access (HSDPA)," and insert -- uplink packet access (HSUPA), --, therefor.

In Column 4, Line 13, delete "protocol" and insert -- protocol. --, therefor.

Signed and Sealed this
Thirtieth Day of August, 2022

Katherine Kelly Vidal
*Director of the United States Patent and Trademark Office*